United States Patent
Sasaki

Patent Number: 5,480,018
Date of Patent: Jan. 2, 1996

[54] HOPPERS FOR MACHINES WITH HOPPERS AND PROCESSING METHOD THEREOF

[75] Inventor: Beji Sasaki, Tokyo, Japan

[73] Assignee: Friends of Freesia Co., Ltd., Tokyo, Japan

[21] Appl. No.: 232,208

[22] PCT Filed: Aug. 23, 1993

[86] PCT No.: PCT/JP93/01172

§ 371 Date: Apr. 29, 1994

§ 102(e) Date: Apr. 29, 1994

[87] PCT Pub. No.: WO94/05477

PCT Pub. Date: Mar. 17, 1994

[30] Foreign Application Priority Data

Sep. 7, 1992 [JP] Japan ..................................... 4-279106

[51] Int. Cl.⁶ .................................................. B65G 11/00
[52] U.S. Cl. ........................... 193/2 R; 220/403; 220/407
[58] Field of Search ............... 198/550.01, 550.2, 198/550.3, 550.4, 550.5; 193/2 R, 25 R; 220/403, 407, 410; 206/524.2, 594

[56] References Cited

U.S. PATENT DOCUMENTS

| | | | |
|---|---|---|---|
| 4,319,694 | 3/1982 | Nehrbass et al. | 220/407 |
| 4,480,411 | 11/1984 | Balz et al. | 220/410 X |
| 4,658,989 | 4/1987 | Bonerb | 220/403 X |
| 5,024,346 | 6/1991 | Roser | 220/410 X |
| 5,255,883 | 10/1993 | Greenfield et al. | 220/407 X |
| 5,258,086 | 11/1993 | Hale | 220/403 X |
| 5,312,162 | 5/1994 | Baebel | 220/410 X |
| 5,363,980 | 11/1994 | Mulcahy | 220/407 X |

FOREIGN PATENT DOCUMENTS

| | | | |
|---|---|---|---|
| 2-83079 | 6/1990 | Japan. | |
| 0192644 | 2/1923 | United Kingdom | 220/407 |

*Primary Examiner*—James R. Bidwell
*Attorney, Agent, or Firm*—Nilles & Nilles

[57] ABSTRACT

Conventional machines with hoppers have such defects that the extruding operation is interrupted when the cleaning of the hopper is carried out and accordingly the working efficiency is reduced. In the present invention, a detachable hopper consisting of one or more thin membrane hoppers in the shape of a hopper is provided detachably along the inside of a hopper for machines with hoppers, and a membrane hopper located at the most inner side of the detachable hopper is used as an inside hopper from which materials are fed, and is removed when the cleaning of the hopper is needed to form a removed hopper. According to the present invention, machines with hoppers of high working efficiency, from which the above defects are obviated, can be obtained.

11 Claims, 4 Drawing Sheets

F I G. 2
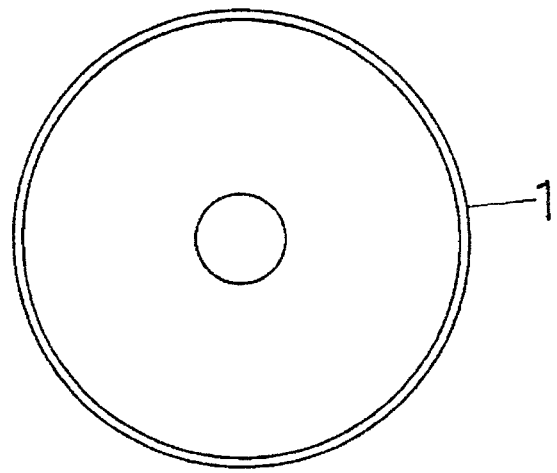
F I G. 3
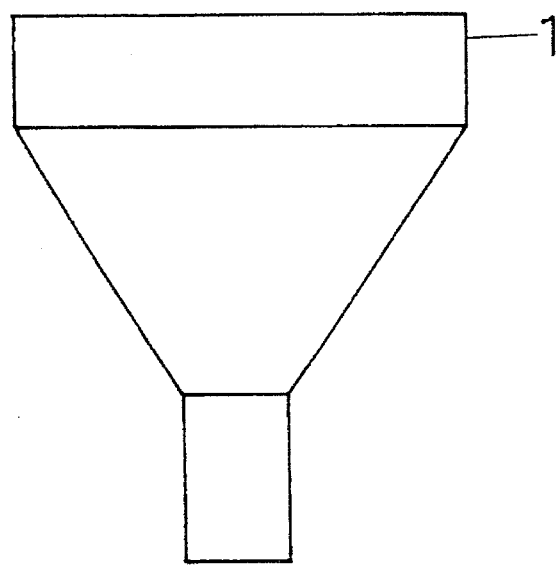
F I G. 4
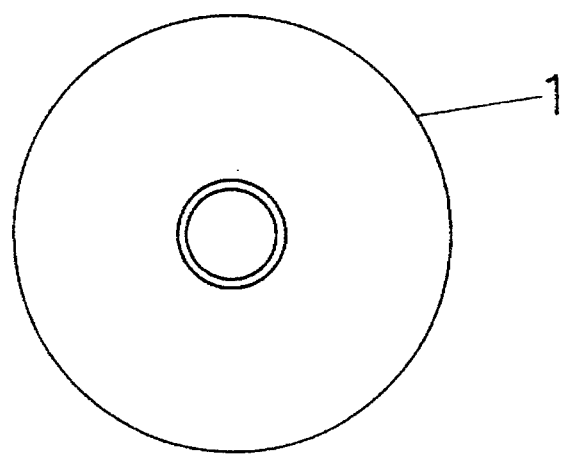

1

HOPPERS FOR MACHINES WITH HOPPERS AND PROCESSING METHOD THEREOF

TECHNICAL FIELD

The present invention relates to a hopper for general machines with hoppers and a processing method thereof.

BACKGROUND ART

In general machines having a hopper for supplying materials, such as, a plastic resin kneading and extruding machine, the inside of the hopper is cleaned directly when the cleaning of the hopper is needed with time. Such a conventional manner has such defects that much labor and time must be necessary and accordingly the working efficiency is reduced. The background of the present invention is to realize a hopper and a processing method thereof which reduce the labor and time for the cleaning of the hopper without reducing the working efficiency.

DISCLOSURE OF INVENTION

A detachable hopper consisting of one or more thin membrane hoppers in the shape of a hopper is provided detachably along the inside of a hopper for machines with hoppers. A thin membrane hopper located at the most inner side of said detachable hopper is used as an inside hopper from which materials are fed, and removed when the cleaning of the hopper is needed to form a removed hopper.

BRIEF DESCRIPTION OF DRAWINGS

FIG. 2 is a side view of a membrane hopper, one part of which is cut out.

FIGS. 3 and 4 are a plan view and a bottom view of the membrane hopper, respectively.

BEST MODE FOR CARRYING OUT THE INVENTION

Figure 1:
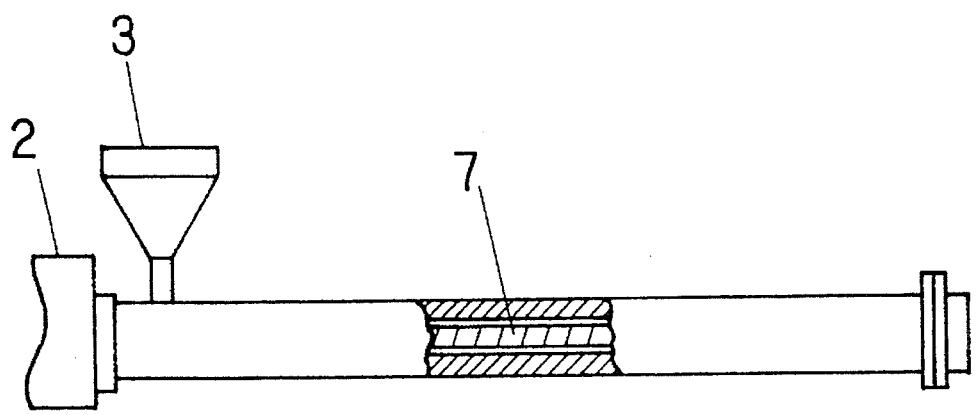
FIG. 1 is a side view of a plastic resin kneading and extruding machine which is an example of machines with hoppers.
Figure 5:
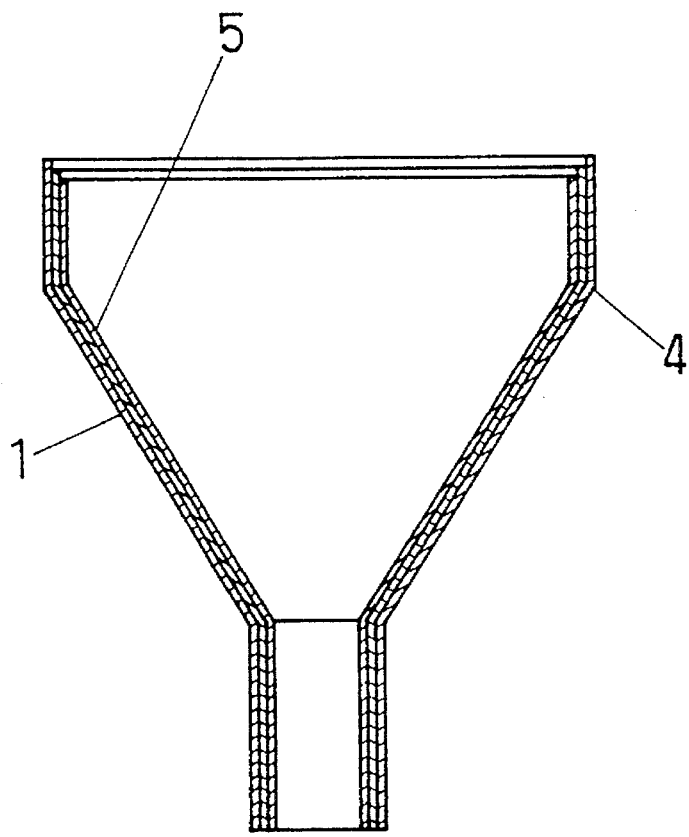
FIG. 5 is a side view of a detachable hopper, one portion of which is cut out.
Figure 6:
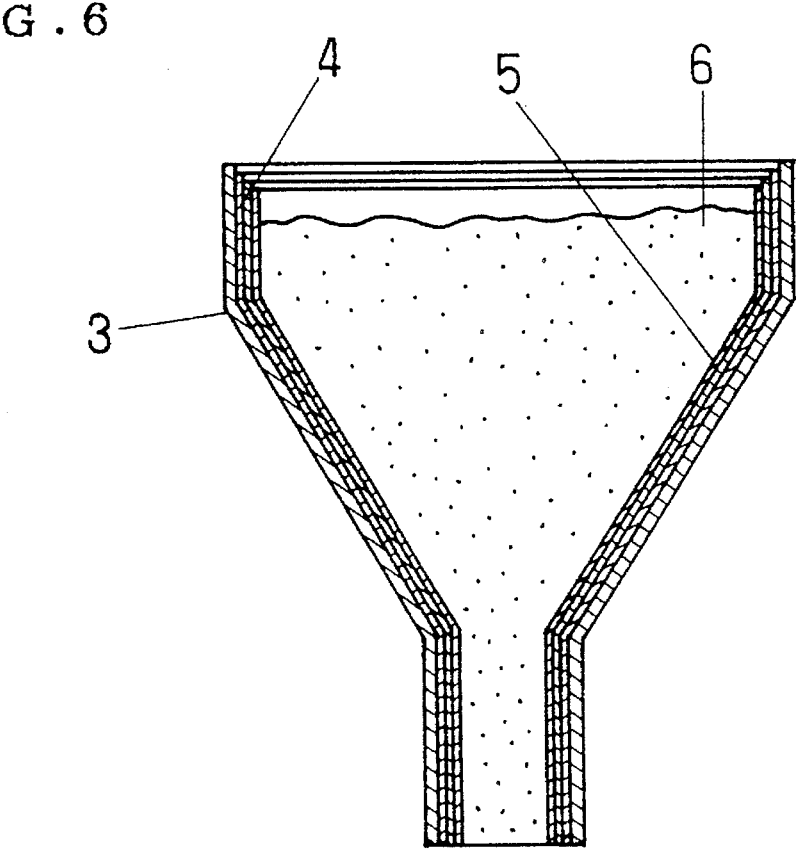
FIG. 6 shows an extruding material supply state with the detachable hopper.
Figure 7:
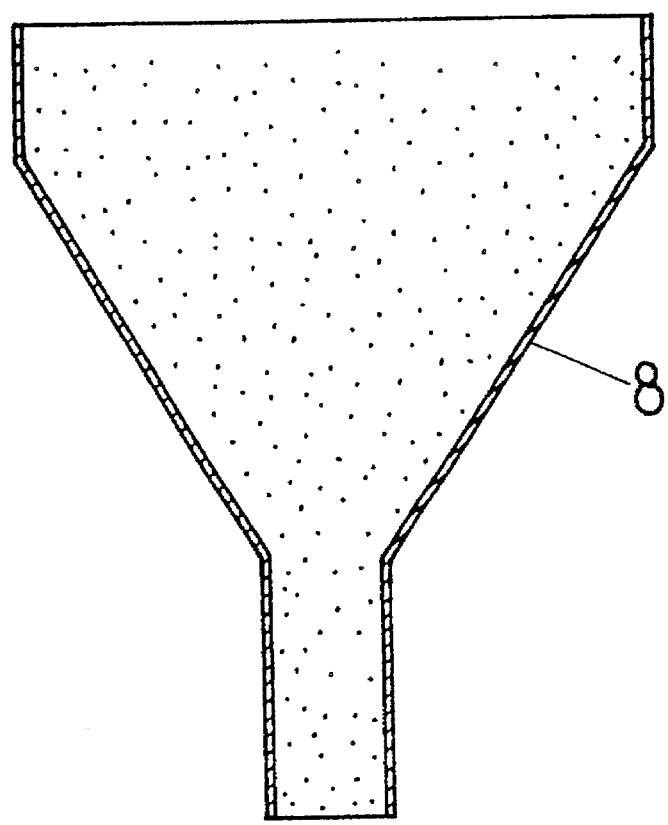
FIG. 7 is a side view of a removed hopper, one portion of which is cut out.

The present invention will be explained more detailedly with reference to the accompanying drawings.

In the present invention, a thin membrane hopper 1 in the shape of a hopper is used. The thin membrane hopper is made of a synthetic resin, paper, wood, metal or the like. A detachable hopper 4 consisting of one or more membrane hoppers 1 is provided detachably along the inside of a hopper 3 of an extruding machine 2. Said detachable hopper is made previously. Said membrane hoppers 1 are superposed one another detachably. The membrane hopper 1 located at the most inner side of the detachable hopper 4 is used as an inside hopper 5. Materials to be supplied are received into said inside hopper 5 and supplied to an extruding portion 7. The inside hopper 5 is removed when the cleaning of the hopper 3 is needed to form a removed hopper 8. The removed hopper 8 is abandoned as a rule. The removed hopper 8 may be recycled after cleaning. The removed hopper 8 may be supplied as materials to be supplied to the extruding portion 7 and processed.

According to the present invention, the cleaning of the hopper can be attained by merely removing the hopper. Accordingly, the cleaning operation can be carried out simply within a short time, so that it hardly affects on the extruding operation. In case that the removed hopper is recycled, the processing thereof can be carried out during the extruding operation. In case that the removed hopper is supplied to the extruding portion, the action of the abandonment can be simplified. The present invention is applied generally to the machines with hoppers, however, it can also be applied properly to the mixers, scramblers or the like.

As stated above, according to the present invention the hopper for machines with hoppers and the processing method thereof having no defects can be realized.

We claim:

1. A main hopper comprising a plurality of thin and rigid membrane hoppers, said membrane hoppers being of a frusto-conical shape and having an upper opening of large diameter and a lower opening of small diameter, said membrane hoppers being laminated to one another detachably, the innermost membrane hopper being removable for cleaning said main hopper.

2. A machine comprising:

a first thin membrane hopper, said first hopper having a frusto-conical shape and having an upper opening of large diameter and a lower opening of small diameter;

a second thin membrane hopper, said second hopper having a frusto-conical shape and having an upper opening of large diameter and a lower opening of small diameter, said second hopper being detachably laminated to said first membrane hopper such that said first membrane hopper is the outer hopper and said second membrane hopper is the inner hopper; and wherein said machine is cleaned by removing said second hopper.

3. The machine as in claim 2, wherein said machine is a plastic resin kneading and extruding machine.

4. The machine as in claim 2, wherein said machine is a mixer.

5. The machine as in claim 2, wherein said first membrane hopper is comprised of one of synthetic resin, paper, wood and metal; and wherein said second membrane hopper is comprised of one of synthetic resin, paper, wood and metal.

6. A machine comprising:

a main hopper;

a liner, said liner being provided along the inside of said main hopper, said liner further including a plurality of thin membrane hoppers having a frusto-conical shape and having an upper opening of large diameter and a lower opening of small diameter, said plurality of membrane hoppers being laminated to one another detachably; and wherein said liner is cleaned by removing the innermost membrane hopper.

7. The machine as in claim 6, wherein said machine is a plastic resin kneading and extruding machine.

8. The machine as in claim 6, wherein said machine is a mixer.

9. The machine as in claim 6, wherein said plurality of thin membrane hoppers are each comprised of one of synthetic resin, paper, wood and metal.

10. A method of processing a machine comprising the steps of:

providing to said machine a main hopper comprising first and second thin and rigid membrane hoppers, said first and second membrane hoppers each having a frusto-conical shape and each having an upper opening of large diameter and a lower opening of small diameter, said providing step including the step of detachably laminating said first membrane hopper to said second membrane hopper such that said first membrane hopper is the outer hopper and said second membrane hopper is the inner hopper; and cleaning said machine, said cleaning step including the step of removing said second membrane hopper from said machine.

11. The method as in claim 10, wherein said first membrane hopper provided to said machine is comprised of one of synthetic resin, paper, wood and metal; and wherein said second membrane hopper provided to said machine is comprised of one of synthetic resin, paper, wood and metal.

* * * * *